United States Patent
Zhan et al.

(10) Patent No.: US 11,702,363 B2
(45) Date of Patent: Jul. 18, 2023

(54) MARINE CONCRETE ADDITIVE, PREPARATION METHOD THEREFOR AND USE THEREOF

(71) Applicant: JIANGSU UNIVERSITY OF SCIENCE AND TECHNOLOGY, Zhenjiang (CN)

(72) Inventors: Qiwei Zhan, Zhenjiang (CN); Zhihong Pan, Zhenjiang (CN); Anhui Wang, Zhenjiang (CN); Juanlan Zhou, Zhenjiang (CN); Changhao Fu, Zhenjiang (CN); Wanying Dong, Zhenjiang (CN); Haitao Hu, Zhenjiang (CN); Xinyu Wang, Zhenjiang (CN); Xinxuan Sun, Zhenjiang (CN); Yiming Ge, Zhenjiang (CN)

(73) Assignee: JIANGSU UNIVERSITY OF SCIENCE AND TECHNOLOGY, Zhenjiang (CN)

( * ) Notice: Subject to any disclaimer, the term of this patent is extended or adjusted under 35 U.S.C. 154(b) by 0 days.

(21) Appl. No.: 17/968,678

(22) Filed: Oct. 18, 2022

(65) Prior Publication Data

US 2023/0039944 A1 Feb. 9, 2023

Related U.S. Application Data

(63) Continuation of application No. PCT/CN2022/089481, filed on Apr. 27, 2022.

(30) Foreign Application Priority Data

Oct. 21, 2021 (CN) .......................... 202111231152.9

(51) Int. Cl.
*C04B 28/02* (2006.01)
*C04B 20/12* (2006.01)
*C04B 20/10* (2006.01)
*C04B 14/30* (2006.01)
*C04B 40/00* (2006.01)
*C04B 103/00* (2006.01)
*C04B 111/74* (2006.01)
*C04B 111/72* (2006.01)

(52) U.S. Cl.
CPC .......... *C04B 20/123* (2013.01); *C04B 14/303* (2013.01); *C04B 20/1022* (2013.01); *C04B 20/1037* (2013.01); *C04B 28/02* (2013.01); *C04B 40/0042* (2013.01); *C04B 2103/0052* (2013.01); *C04B 2111/72* (2013.01); *C04B 2111/74* (2013.01)

(58) Field of Classification Search
CPC . C04B 20/123; C04B 14/303; C04B 20/1022; C04B 20/1037; C04B 28/02; C04B 40/0042; C04B 2103/0052; C04B 2111/72; C04B 2111/74
USPC ......................................................... 523/177
See application file for complete search history.

(56) References Cited

U.S. PATENT DOCUMENTS

2014/0290533 A1 10/2014 Lv et al.

FOREIGN PATENT DOCUMENTS

| CN | 102992675 A | 3/2013 |
|---|---|---|
| CN | 104909636 A | 9/2015 |
| CN | 108046678 A | 5/2018 |
| CN | 111116077 A | 5/2020 |

OTHER PUBLICATIONS

English Translation of CN 113880480 (Year: 2022).*

* cited by examiner

*Primary Examiner* — Hannah J Pak
(74) *Attorney, Agent, or Firm* — CBM Patent Consulting, LLC

(57) ABSTRACT

A preparation method for a concrete additive for a maritime work environment includes: S1, compounding a volcanic ash material containing aluminum oxide and lime in proportion, loading a mixture into a sugar coating machine, and spraying a proper amount of alcohol, to prepare spherical particles; S2, adding the spherical particles in S1 and cement into the sugar coating machine, uniformly spraying deionized water in a rotating process, and coating surface layers of the spherical particles with a layer of cement for maintenance; and S3, placing the maintained particles in S2 into a hydrophobic emulsion, and coating the surface layers of the particles with a layer of hydrophobic emulsion, to obtain a concrete additive.

8 Claims, 2 Drawing Sheets

MARINE CONCRETE ADDITIVE, PREPARATION METHOD THEREFOR AND USE THEREOF

CROSS REFERENCES

This application is the continuation of International Application No. PCT/CN2022/089481 filed on 27 Apr. 2022 which designated the U.S. and claims priority to Chinese Application Nos. CN202111231152.9 filed on 21 Oct. 2021, the entire contents of each of which are hereby incorporated by reference.

TECHNICAL FIELD

The present disclosure belongs to crossed science and technology in multiple fields of microbiology, material science and civil engineering, and particularly relates to a marine concrete additive, a preparation method therefor and a use thereof.

BACKGROUND ART

Cement-based materials are one of the most popular building materials required for ocean engineering or coastal engineering. However, with relatively-low tensile strength, cracks inevitably appear in the cement-based materials under the action of internal and external factors, and after ions containing $Cl^-$, $SO_4^{2-}$ and $Mg^{2+}$ in seawater intrude into the cement-based materials, the ions react with cement hydration products to cause different degrees of erosion and damage to an engineering structure, thereby continuously reducing the performance of the cement-based materials, and seriously affecting the durability and service life of a building. Therefore, how to timely and effectively repair the cracks in the cement-based materials is one of the problems urgently to be solved to ensure long-term safe operation of marine environment construction engineering.

SUMMARY

Objective of invention: the objective of the present disclosure is to provide a concrete additive capable of effectively solving the problem of sulfate erosion in ocean. The second objective of the present disclosure is to provide a preparation method for the above concrete additive and a use of the concrete additive in the field of repairing cracks in maritime cement-based materials.

Technical solution: the preparation method for a concrete additive for a maritime work environment of the present disclosure includes:

S1, compounding a volcanic ash material containing aluminum oxide and lime in proportion, loading a mixture into a sugar coating machine, and spraying a proper amount of alcohol, to prepare spherical particles;

S2, adding the spherical particles in S1 and cement into the sugar coating machine, uniformly spraying deionized water in a rotating process, and coating surface layers of the spherical particles with a layer of cement for maintenance; and S3, placing the maintained particles in S2 into a hydrophobic emulsion, and coating the surface layers of the particles with a layer of hydrophobic emulsion, to obtain a concrete additive.

Further, the volcanic ash material containing aluminum oxide is natural volcanic ash and/or fly ash.

Further, a mass ratio of the volcanic ash material containing aluminum oxide to the lime is 1:1-3.

Further, the spherical particles obtained in S1 have a particle size ranging from 2.0 mm to 3.0 mm, and the cement in S2 has a coating thickness ranging from 2.0 mm to 3.0 mm.

Further, the hydrophobic emulsion in S3 is composed of a modified silicone oil siloxane polymer and water.

Further, a mass ratio of the modified silicone oil siloxane polymer to the water 1:5-10.

Further, conditions of the maintenance in S2 are as follows: humidity ranges from 90% to 95%, a temperature ranges from 20° C. to 23° C., and time ranges from 7 days to 14 days.

Further, in S1 and S2, the sugar coating machine has a rotating speed ranging from 10 r/min to 50 r/min, and a liquid spraying amount ranging from 5 ml/min to 20 ml/min.

A concrete additive for a maritime work environment prepared by the preparation method.

A use of the concrete additive in the field of repairing cracks in maritime cement-based materials.

Further, the concrete additive is used to replace part of sand, and a water cement ratio is kept unchanged to prepare a φ100 mm*100 mm test piece. The test piece is maintained at a normal temperature for 24-48 hours, and then is maintained in a normal-temperature water environment for 28 days, then cracks are artificially manufactured by means of a press machine, and the cracked test piece is placed in a water environment containing 5% of sulfate, to monitor a crack repairing effect of the cracked test piece.

Further, a replacement rate of the repairing carrier to replace part of sand ranges from 1% to 10%.

Further, the cracks are penetrating cracks, and have a width ranging from 100 μm to 200 μm.

Beneficial effects: the concrete additive of the present disclosure is used for repairing cracks in cement-based materials, and compared with a traditional repairing method, the concrete additive has the following beneficial effects: (1) after cracks crack, seawater entering a matrix reacts with the volcanic ash material containing activated aluminum oxide and the lime, to form ettringite, so as to fill and seal the cracks, thereby self-repairing cracks in seawater-excited cement-based materials; (2) sulfate ions in the seawater are used as a reactant, and sulfate radicals are continuously consumed in an ettringite forming process, thereby avoiding erosion of sulfate to the maritime cement-based materials, and improving durability of the maritime work cement-based material, and prolonging service life of the maritime cement-based materials; and (3) a surface layer of the concrete additive is coated with the hydrophobic emulsion, thereby preventing water from entering the carrier, and ensuring that no reaction occurs before the carrier does not break.

DETAILED DESCRIPTION OF THE EMBODIMENTS

Figure 1:
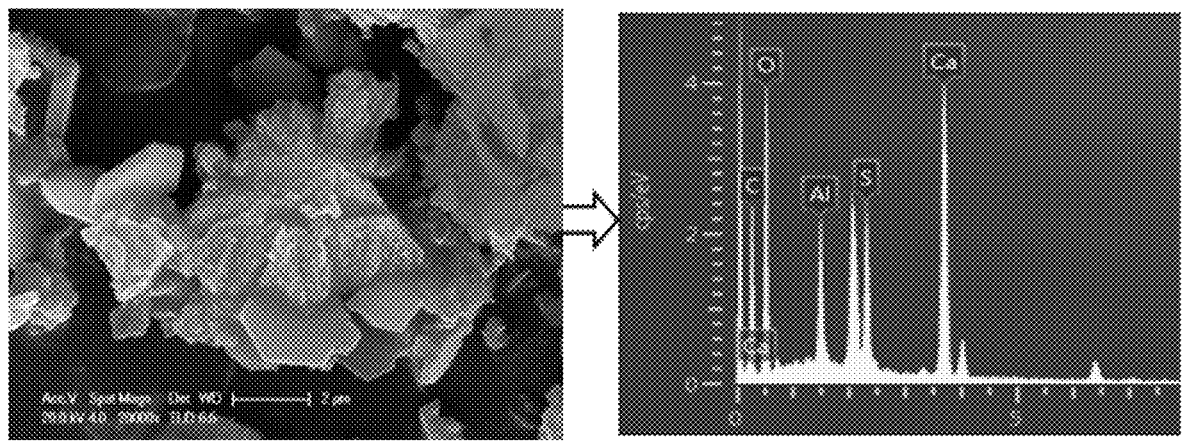
FIG. 1 is a scanning electron microscope (SEM) image and an energy dispersive spectroscopy (EDS) diagram of crack area products in a test piece of the present disclosure.

In order to further understand the content of the present disclosure, the present disclosure will be described in detail with reference to the accompanying drawings and embodiments.

Embodiment 1

A marine concrete additive and a preparation method therefor are provided. The preparation method includes:

S1, compound a fly ash and lime in a mass ratio of 1:1, load a mixture into a sugar coating machine, and spray a proper amount of alcohol, to prepare spherical particles having a particle size of 2.0 mm, the sugar coating machine having a rotating speed of 10 r/min, and a liquid spraying amount of 5 ml/min;

S2, add the spherical particles and cement into the sugar coating machine, uniformly spray deionized water in a rotating process, and coat surface layers of the spherical particles with a layer of cement having a thickness of 2.0 mm for maintenance under a standard condition, conditions of the maintenance being as follows: humidity ranges from 90% to 95%, a temperature ranges from 20° C. to 23° C., and time ranges from 7 days; and S3, place the maintained particles into a hydrophobic emulsion, the hydrophobic emulsion being composed of a modified silicone oil siloxane polymer and water, a ratio of the modified silicone oil siloxane polymer to the water being 1:5, and coat the surface layers of the particles with a layer of hydrophobic emulsion, to obtain a concrete additive.

Use test: the concrete additive prepared in Embodiment 1 is used to replace 2% of sand, and a water cement ratio is kept unchanged to prepare a φ100 mm*100 mm test piece. The test piece is maintained at a normal temperature for 24 hours, and then is maintained in a normal-temperature water environment for 28 days, then cracks having a width of 100 μm are artificially manufactured by means of a press machine, and the cracked test piece is placed in a water environment containing 5% of sulfate, to monitor a crack repairing effect of the cracked test piece.

Embodiment 2

A marine concrete additive and a preparation method therefor are provided. The preparation method includes:

S1, compound fly ash and lime in a mass ratio of 1:3, load a mixture into a sugar coating machine, and spray a proper amount of alcohol, to prepare spherical particles having a particle size of 2.0 mm, the sugar coating machine having a rotating speed of 50 r/min, and a liquid spraying amount of 20 ml/min;

S2, add the spherical particles and cement into the sugar coating machine, uniformly spray deionized water in a rotating process, and coat surface layers of the spherical particles with a layer of cement having a thickness of 2.0 mm for maintenance under a standard condition, conditions of the maintenance being as follows: humidity ranges from 90% to 95%, a temperature ranges from 20° C. to 23° C., and time ranges from 7 days; and S3, place the maintained particles into a hydrophobic emulsion, the hydrophobic emulsion being composed of a modified silicone oil siloxane polymer and water, a ratio of the modified silicone oil siloxane polymer to the water being 1:10, and coat the surface layers of the particles with a layer of hydrophobic emulsion, to obtain a concrete additive.

Use test: the concrete additive prepared in Embodiment 2 is used to replace 8% of sand, and a water cement ratio is kept unchanged to prepare a φ100 mm*100 mm test piece. The test piece is maintained at a normal temperature for 24 hours, and then is maintained in a normal-temperature water environment for 28 days, then cracks having a width of 100 μm are artificially manufactured by means of a press machine, and the cracked test piece is placed in a water environment containing 5% of sulfate, to monitor a crack repairing effect of the cracked test piece.

Embodiment 3

A marine concrete additive and a preparation method therefor are provided. The preparation method includes:

S1, compound fly ash and lime in a mass ratio of 1:2, load a mixture into a sugar coating machine, and spray a proper amount of alcohol, to prepare spherical particles having a particle size of 2.0 mm, the sugar coating machine having a rotating speed of 20 r/min, and a liquid spraying amount of 10 ml/min;

S2, add the spherical particles and cement into the sugar coating machine, uniformly spray deionized water in a rotating process, and coat surface layers of the spherical particles with a layer of cement having a thickness of 2.0 mm for maintenance under a standard condition, conditions of the maintenance being as follows: humidity ranges from 90% to 95%, a temperature ranges from 20° C. to 23° C., and time ranges from 7 days; and S3, place the maintained particles into a hydrophobic emulsion, the hydrophobic emulsion being composed of a modified silicone oil siloxane polymer and water, a ratio of the modified silicone oil siloxane polymer to the water being 1:5, and coat the surface layers of the particles with a layer of hydrophobic emulsion, to obtain a concrete additive.

Use test: the concrete additive prepared in Embodiment 2 is used to replace 5% of sand, and a water cement ratio is kept unchanged to prepare a φ100 mm*100 mm test piece. The test piece is maintained at a normal temperature for 24 hours, and then is maintained in a normal-temperature water environment for 28 days, then cracks having a width of 100 μm are artificially manufactured by means of a press machine, and the cracked test piece is placed in a water environment containing 5% of sulfate, to monitor a crack repairing effect of the cracked test piece.

FIG. 1 is a scanning electron microscope (SEM) image and an energy dispersive spectroscopy (EDS) diagram of crack area products in a test piece prepared, which indicates that a mineralized product consisting of C, O, Ca, Al and S elements is formed in a crack area.

Figure 2:
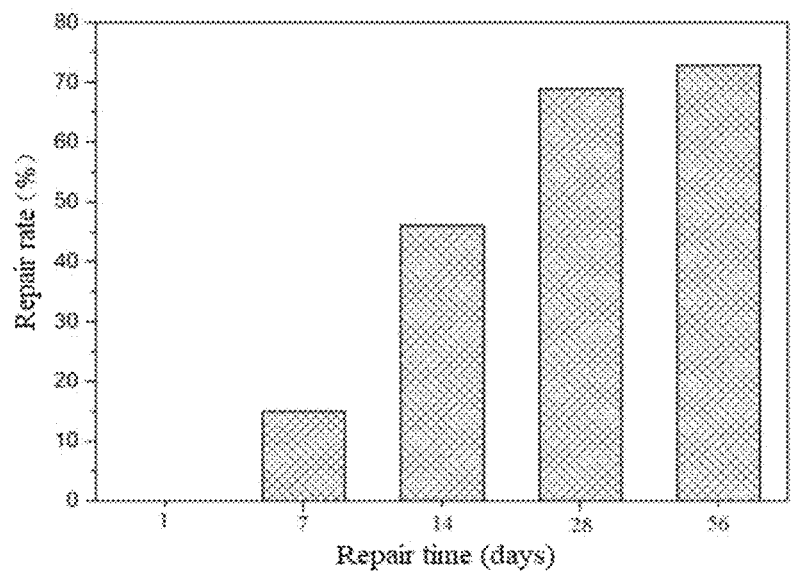
FIG. 2 is a repair rate of cracks in a test piece in Embodiment 3.

FIG. 2 is a repair rate of cracks in a test piece in Embodiment 3, a repair effect of a surface is gradually enhanced along with prolonging of repair time, and the repair rate is 70% or above when repair is performed for 56 days.

Figure 3:
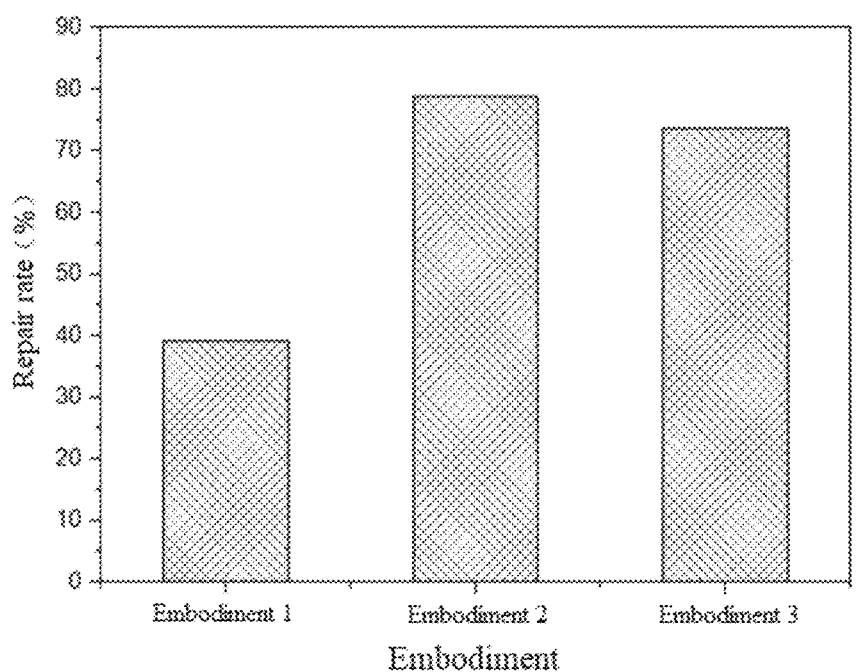
FIG. 3 is repair rates of cracks in test pieces of Embodiment 1-3.

FIG. 3 is repair rates of cracks in test pieces of Embodiment 1-3, which indicates that repair effects in Embodiments are different when repair is performed for 56 days, and the repair rate in Embodiment 2 is the highest and is close to 80%.

What is claimed is:

1. A preparation method for a concrete additive for a maritime work environment, comprising:

S1, compounding a volcanic ash material containing aluminum oxide and lime in proportion to form a mixture, loading the mixture into a sugar coating machine, and spraying alcohol to achieve spherical particles;

S2, adding the spherical particles in S1 and cement into the sugar coating machine, uniformly spraying deionized water in a rotating process, and coating surface layers of the spherical particles with a layer of cement for maintenance; wherein conditions of the maintained in S2 are as follows: humidity ranges from 90% to 95%, a temperature ranges from 20° C. to 23° C., and time ranges from 7 days to 14 days, and S3, placing the maintained particles in S2 into a hydrophobic emulsion, and coating the surface layers of the particles with a layer of hydrophobic emulsion, to obtain a concrete additive.

2. The preparation method according to claim 1, wherein the volcanic ash material containing aluminum oxide is natural volcanic ash and/or fly ash.

3. The preparation method according to claim 1, wherein a mass ratio of the volcanic ash material containing aluminum oxide to the lime is 1:1-3.

4. The preparation method according to claim 1, wherein the spherical particles obtained in S1 have a particle size ranging from 2.0 mm to 3.0 mm, and the cement in S2 has a coating thickness ranging from 2.0 mm to 3.0 mm.

5. The preparation method according to claim 1, wherein the hydrophobic emulsion in S3 is composed of a modified silicone oil siloxane polymer and water.

6. The preparation method according to claim 5, wherein a mass ratio of the modified silicone oil siloxane polymer to the water is 1:5-10.

7. The preparation method according to claim 1, wherein the sugar coating machine has a rotating speed ranging from 10 r/min to 50 r/min.

8. A concrete additive for a maritime work environment prepared by the preparation method of claim 1.

* * * * *